United States Patent [19]

Danckert et al.

[11] 4,186,714

[45] Feb. 5, 1980

[54] SOUND INSULATED INTERNAL COMBUSTION ENGINE

[75] Inventors: Hermann Danckert; Michael Willmann; Egon Wundrak, all of Wolfsburg, Fed. Rep. of Germany

[73] Assignee: Volkswagenwerk Aktiengesellschaft, Wolfsburg, Fed. Rep. of Germany

[21] Appl. No.: 952,446

[22] Filed: Oct. 18, 1978

[30] Foreign Application Priority Data

Jun. 14, 1978 [DE] Fed. Rep. of Germany ....... 2825927

[51] Int. Cl.$^2$ ........................... F02F 7/00; B60K 9/00

[52] U.S. Cl. ............................ 123/195 C; 123/195 S; 123/198 E; 180/291; 181/204

[58] Field of Search ............ 123/195 C, 195 S, 198 E, 123/41.7; 181/204; 248/632, 634; 180/64 M, 64 R

[56] References Cited

U.S. PATENT DOCUMENTS

| | | | |
|---|---|---|---|
| 3,430,901 | 3/1969 | Cauvin | 248/632 |
| 3,540,425 | 11/1970 | Scheiterlein et al. | 181/204 |
| 3,684,053 | 8/1972 | Fachbach et al. | 123/198 E |
| 3,695,386 | 10/1972 | Thien et al. | 123/195 C |
| 3,796,280 | 3/1974 | Thien et al. | 123/198 E |
| 4,027,644 | 6/1977 | Timour | 123/198 E |
| 4,066,058 | 1/1978 | Anderkay | 123/198 E |
| 4,137,888 | 2/1979 | Allan | 123/198 E |
| 4,141,334 | 2/1979 | Hatz et al. | 123/198 E |

FOREIGN PATENT DOCUMENTS

| | | | |
|---|---|---|---|
| 2723459 | 12/1978 | Fed. Rep. of Germany | 123/195 C |

*Primary Examiner*—Ira S. Lazarus

*Attorney, Agent, or Firm*—Spencer & Kaye

[57] ABSTRACT

An internal combustion engine has an engine block, an oil pan and a sound insulating capsule shrouding the engine block. The engine block and the oil pan have circumferential mounting faces oriented towards one another. A mounting arrangement includes a sound dampening intermediate layer situated between the mounting faces for a noise-dampened connection of the oil pan with the engine block and with a lower terminal zone of the capsule. The oil pan is held by the lower terminal zone of the capsule and the capsule is supported by a component other than the internal combustion engine. The intermediate layer is constituted by a gasket which has at least one fold to take up relative motions between the engine block and the oil pan during operation of the internal combustion engine.

5 Claims, 5 Drawing Figures

SOUND INSULATED INTERNAL COMBUSTION ENGINE

BACKGROUND OF THE INVENTION

This invention is an improvement of an internal combustion engine which is encapsulated in a soundproof manner and which has an oil pan connected with the engine block by means of a sound dampening intermediate layer situated between circumferential mounting faces of the engine block and the oil pan. The oil pan is also connected with sound dampening means to a lower terminal zone of the capsule. Such an arrangement is disclosed in United States patent application Ser. No. 952,445, filed Oct. 18, 1978 and entitled SOUND INSULATED INTERNAL COMBUSTION ENGINE.

SUMMARY OF THE INVENTION

It is an object of the invention to provide an improved soundproof encapsulated internal combustion engine in which, without additional structural components, a sealing securement of the oil pan and the capsule to the engine block of the internal combustion engine is ensured even if the operating engine executes displacements relative to its environment, such as the body of the vehicle in which the engine is installed.

This object and others to become apparent as the specification progresses, are accomplished by the invention, according to which, briefly stated, the internal combustion engine has an engine block, an oil pan and a sound insulating capsule shrouding the engine block. The engine block and the oil pan have circumferential mounting faces oriented towards one another. A mounting arrangement includes a sound dampening intermediate layer situated between the mounting faces for a noise-dampened connection of the oil pan with the engine block and with a lower terminal zone of the capsule. The oil pan is held by the lower terminal zone of the capsule and the capsule is supported by a component other than the internal combustion engine. The intermediate layer is constituted by a gasket which has at least one fold to take up relative motions between the engine block and the oil pan during operation of the internal combustion engine.

Thus, according to the invention, the oil pan which needs to be designed only on the basis of its required function as an oil sump, is held at the lower zone of the sound insulating capsule which, in turn, is secured not to the internal combustion engine but, for example, to the vehicle body. To ensure an oil tight connection between the oil pan and the engine block, there is provided a gasket which has at least one fold dimensioned in such a manner that it may take up relative displacements between the oil pan and the engine block.

DESCRIPTION OF THE PREFERRED EMBODIMENT

Figure 1:
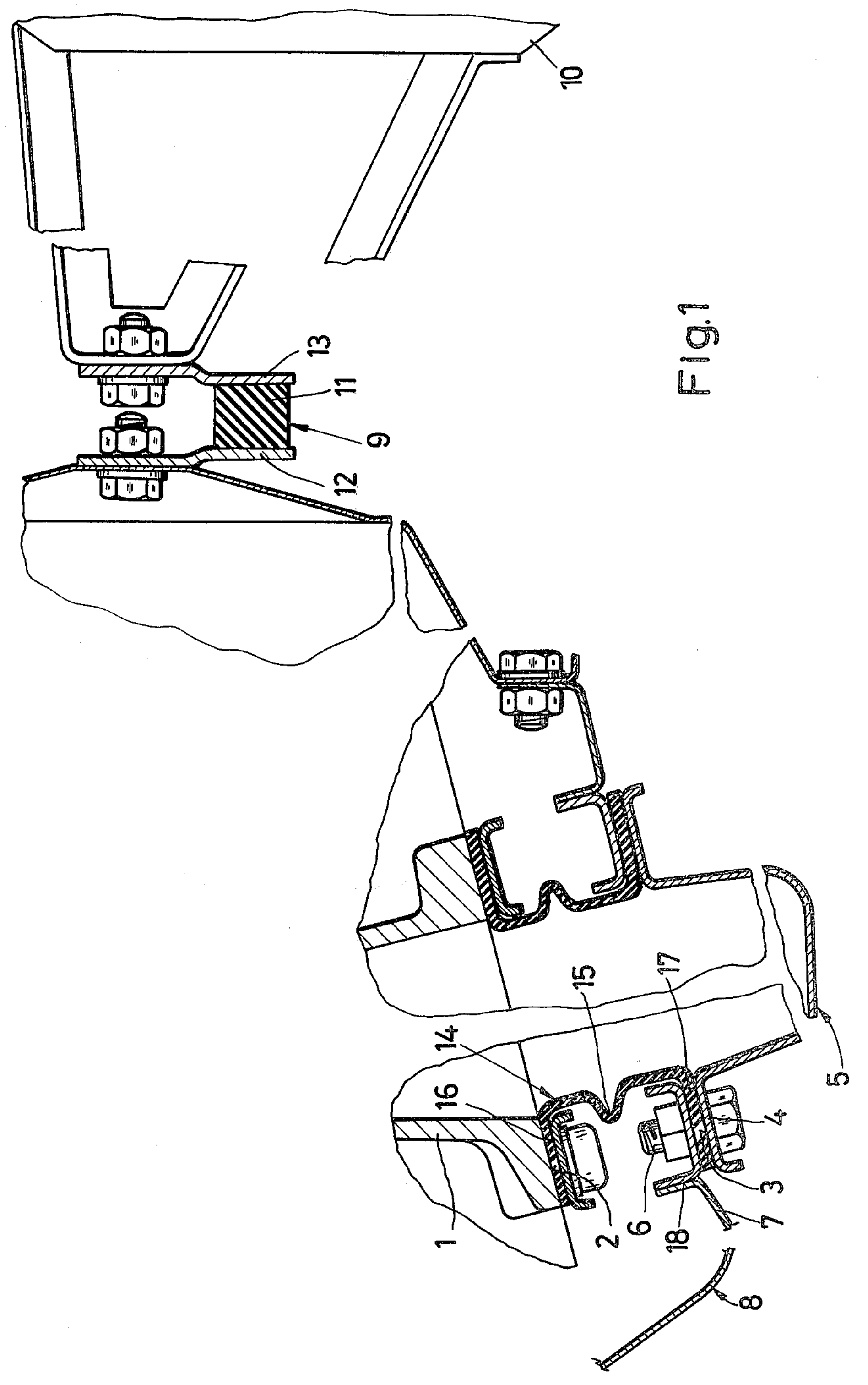
FIG. 1 is a fragmentary sectional elevational view of parts of an internal combustion engine with associated mounting means.

Turning now to FIG. 1, there are shown parts of a crank case 1 forming part of an engine block and provided with a lower mounting face 2 which has a circumferential course. The mounting face 2 is aligned with an upwardly oriented mounting face 3 of a flange-like circumferential bent portion 4 which forms part of an oil pan 5 and which is arranged at a clearance from the mounting face 2. The oil pan 5 is held at the lower terminal zone 7 of a sound dampening capsule 8 by means of securing screws, with the interposition of additional components, if required. The capsule 8 is attached to the vehicle body 10 as indicated at 9. The connection 9 too, is expediently of sound dampening design; for this purpose there is provided a rubber buffer 11 which is connected with the two metal webs 12 and 13 attached, respectively, to the capsule 8 and the vehicle body 10.

The structural details of the oil pan 5, particularly a subdivision of its internal space and further, an arrangement for oil removal are not pertinent to the invention and therefore such details are not illustrated in FIG. 1. The invention is concerned with the structure of an oil tight connection between the engine block 1, on the one hand, and the oil pan 5, on the other hand.

The oil tight connection according to the invention is constituted by a circumferential sealing gasket 14 which has sound dampening properties and has at least one fold 15, so that the gasket 14 has a generally E-shaped cross section as shown in FIG. 1. The central web of the cross-sectional shapeis constituted by the fold 15 and its two outer webs 16 and 17 serve as flanges (provided with openings for the passage of the screws 6) for a face-to-face engagement with the mounting faces 2 and 3, respectively. By virtue of the elasticity of the material of the sealing gasket, coupled with its shape, characterized in particular by the fold 15, a sealed connection between the engine block 1 and the oil pan 5 is ensured even in case of any relative motion between these two components, since the folded structure of the gasket 14 ensures that the gasket 14 is not exposed to impermissibly high stresses during such relative motions generated during engine run.

Figure 2:
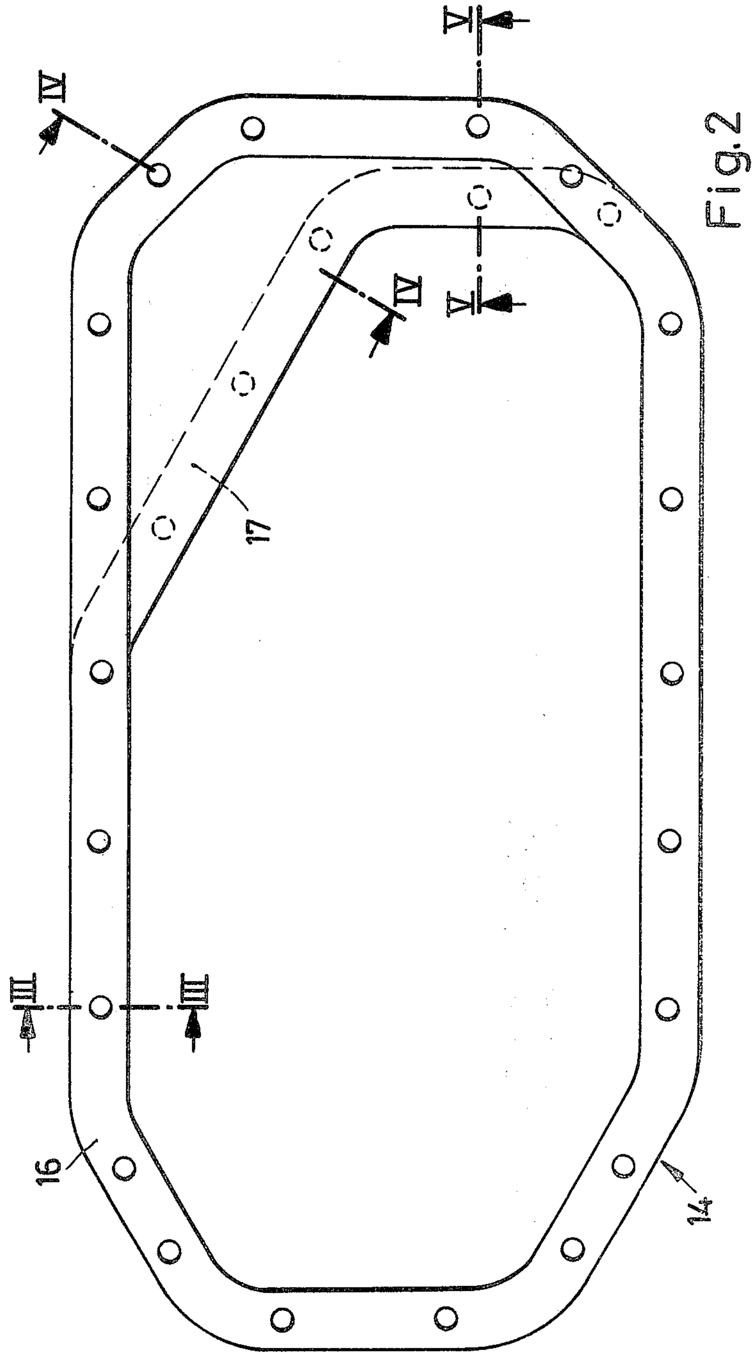
FIG. 2 is a top plan view of a gasket according to the invention.
Figure 3:
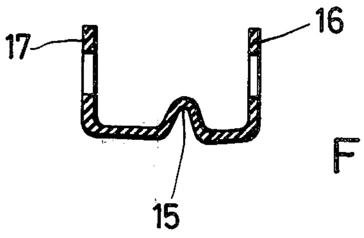
FIGS. 3, 4 and 5 are sectional views taken along lines III—III, IV—IV and V—V, respectively, of FIG. 2.
Figure 4:
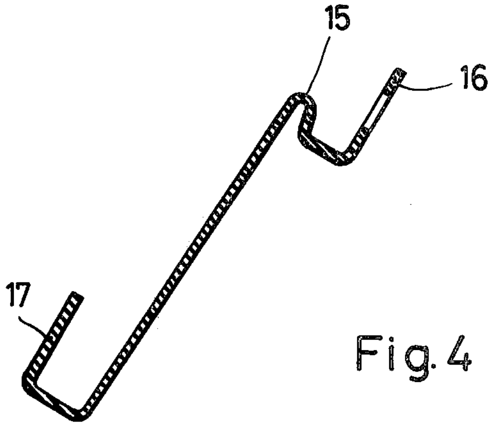
Figure 5:
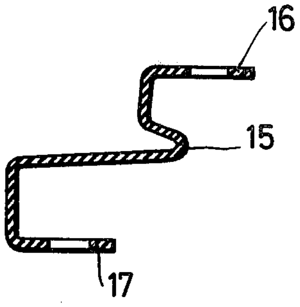

As it may be observed in FIG. 2, the gasket 14 forms a circumferentially closed member, the cross-sectional shape of which, however, is not uniform at all locations. Approximately at the left-hand half of FIG. 2, the gasket 14 has the above-discussed E-shaped cross section which is also shown in FIG. 3. In FIGS. 2 through 5 the holes in the gasket 14 for the passage of the screws 6 are clearly shown.

In the right-hand portion of FIG. 2, the sealing gasket 14 has asymmetrical cross-sectional shapes which may be characterized as a "deformed E". While in these cross-sectional configurations two outer legs 16 and 17 and the central leg 15 of an "E", as shown in FIGS. 4 and 5, can again be recognized, it is noted that the outer legs 16 and 17 are no longer superposed (aligned) but are offset laterally, so that while taking into account possibilities of relative motions between the engine block and the oil pan or the capsule, an equalization (compensation) between the unlike shapes of the circumferential mounting faces 2 and 3 occurs.

Turning now once again to FIG. 1, the lower outer web 17 of the cross-sectionally E-shaped sealing gasket 14 is clamped between the mounting face 3 of the oil pan 5, on the one hand, and the mounting rail 18 in the lower terminal zone 7 of the capsule 8, on the other hand, so that the outer web 17 counteracts any sound transmission from the oil pan to the capsule.

It is to be understood that the sealing gasket may have more than one fold.

It is to be understood that the above description of the present invention is susceptible to various modifications, changes and adaptations, and the same are intended to be comprehended within the meaning and range of equivalents of the appended claims.

What is claimed is:

1. In an internal combustion engine having an engine block, an oil pan and a sound insulating capsule shrouding the engine block; the engine block and the oil pan having circumferential mounting faces oriented towards one another; mounting means including a sound dampening intermediate layer situated between said mounting faces for a noise-dampened connection of said oil pan with said engine block and with a lower terminal zone of the capsule; the improvement comprising means for attaching said oil pan to said lower terminal zone of said capsule; further wherein said capsule is supported by a component other than the internal combustion engine and wherein said intermediate layer is constituted by a gasket having at least one fold to take up relative motions between said engine block and said oil pan during operation of the internal combution engine.

2. An internal combustion engine as defined in claim 1, wherein at least a portion of said gasket has a generally E-shaped cross section including a center web formed by said fold and two outer webs flanking the center web and constituting flanges being connected, respectively, with the mounting face of said engine block and said oil pan.

3. An internal combustion engine as defined in claim 1, wherein at least a portion of said gasket has an asymmetrical cross section having the shape of a deformed E, including a center web formed by said fold and two outer webs flanking said center web and being offset with respect to one another; said outer webs constituting flanges being connected, respectively, with the mounting face of said engine block and said oil pan.

4. An internal combustion engine as defined in claim 2, wherein one of said flanges is clamped between said mounting face of said oil pan and said lower terminal zone of said capsule.

5. An internal combustion engine as defined in claim 3, wherein one of said flanges is clamped between said mounting face of said oil pan and said lower terminal zone of said capsule.

* * * * *